(12) United States Patent
Chuang et al.

(10) Patent No.: US 10,985,398 B2
(45) Date of Patent: Apr. 20, 2021

(54) BATTERY UNIT AND BATTERY SET

(71) Applicant: Acer Incorporated, New Taipei (TW)

(72) Inventors: Shao-Chi Chuang, New Taipei (TW);
Wen-Pin Chang, New Taipei (TW);
Pu-De Ciou, New Taipei (TW);
Wen-Shu Lee, New Taipei (TW)

(73) Assignee: Acer Incorporated, New Taipei (TW)

( * ) Notice: Subject to any disclaimer, the term of this patent is extended or adjusted under 35 U.S.C. 154(b) by 131 days.

(21) Appl. No.: 16/199,217

(22) Filed: Nov. 25, 2018

(65) Prior Publication Data

US 2020/0075986 A1 Mar. 5, 2020

(30) Foreign Application Priority Data

Aug. 31, 2018 (TW) .................................. 107130677

(51) Int. Cl.
*H01M 10/04* (2006.01)
*H01M 2/20* (2006.01)
*H01M 2/26* (2006.01)

(52) U.S. Cl.
CPC ......... *H01M 10/049* (2013.01); *H01M 2/202* (2013.01); *H01M 2/26* (2013.01)

(58) Field of Classification Search
CPC ................................ H01M 2/202; H01M 2/26
See application file for complete search history.

(56) References Cited

U.S. PATENT DOCUMENTS

| 9,893,333 B2 | 2/2018 | Hoshi et al. |
| 10,044,011 B2 | 8/2018 | Peng et al. |
| 2014/0199573 A1* | 7/2014 | Cho ...................... H01M 2/105 429/99 |
| 2017/0025654 A1* | 1/2017 | Oh ........................ H01M 2/202 |

FOREIGN PATENT DOCUMENTS

| CN | 106711365 | 5/2017 |
| CN | 106784496 | 5/2017 |
| TW | 201216543 | 4/2012 |
| TW | 201304252 | 1/2013 |
| TW | I604653 | 11/2017 |

* cited by examiner

*Primary Examiner* — Ladan Mohaddes
(74) *Attorney, Agent, or Firm* — JCIPRNET

(57) ABSTRACT

A battery unit includes two bases, two locking components, a plurality of battery cells and two electrode pieces. The two bases fixed to each other through the two locking components. The battery cells and the two electrode pieces are accommodated in the two bases. Two opposite ends of each battery cell respectively abut against the two electrode pieces. Each base has an engaging protrusion and an engaging groove. A battery set is also provided. The battery set is composed by the plurality of battery units and the battery units are electrically connected with each other through at least one electrical connecting component. One of the battery units is engaged with the engaging groove of the other one of battery units through the engaging protrusion.

10 Claims, 7 Drawing Sheets

BATTERY UNIT AND BATTERY SET

CROSS-REFERENCE TO RELATED APPLICATION

This application claims the priority benefit of Taiwan application serial no. 107130677, filed on Aug. 31, 2018. The entirety of the above-mentioned patent application is hereby incorporated by reference herein and made a part of this specification.

BACKGROUND

Field of the Disclosure

The disclosure relates to a battery unit and a battery set, and more particularly relates to a battery unit and a battery set using the same.

Description of Related Art

Along with the rise of environmental awareness, electric-powered vehicles, such as electric car, electric scooter, and electric bicycle, etc., have become the first choice of drivers, riders or passengers. The battery set used for supplying power to the electric car, electric scooter, and electric bicycle has become key projects which have been actively invested by related manufacturers.

Commonly, the battery set is formed by installing several battery cells into the same battery holder, different size of the battery holder is manufactured according to the number of the battery cells in order to carry a specific number of battery cells, so the manufacturing cost is extremely high, especially the manufacturing cost of the mold. Apart from that, due to the structural design of the existing battery holder, several battery sets can only be serially connected in a single direction, and the number of the battery cells is unable to be flexibly adjusted, so scalability is poor.

SUMMARY

The disclosure provides a battery unit and a battery set, having good scalability.

A battery unit of the disclosure includes two bases, two locking components, a plurality of battery cells and two electrode pieces. Each of the bases has a first surface, a second surface opposite to the first surface, an engaging protrusion connecting the first surface, an engaging groove connecting the first surface, a through hole penetrating the first surface and the second surface, a first lock hole located at the second surface and a recess located at the second surface. The two second surfaces of the two bases abut against each other, and the through hole of one of the two bases is aligned with the first lock hole of the other one of the two bases. The two locking components are respectively inserted into and fixed to each of the through hole and the corresponding first lock hole. The battery cells are disposed in the two recesses aligned with each other. The two electrode pieces are respectively disposed in the two recesses, and two opposite ends of each of the battery cells respectively abut against the two electrode pieces. Each of the electrode pieces includes a conductive extending portion. Each of the conductive extending portions penetrates through the corresponding base and extends to the first surface.

A battery set of the disclosure includes n battery units and n−1 electrical connecting components, and n is a positive integer greater than or equal to 2. One of the battery units is engaged with the engaging groove of the other one of battery units through the engaging protrusion. Each of the engaging grooves has a second lock hole disposed therein, and each of the engaging protrusions has a third lock hole. The third lock hole of each of the engaging protrusions and the second lock hole of the corresponding engaging groove are aligned with each other and a first positioning member being inserted and fixed therein. The electrical connecting component is configured to electrically connect the battery units adjacent to each other. The electrical connecting component includes a first end and a second end opposite to each other, respectively disposed on the two first surfaces adjacent to each other, and configured to contact two of the conductive extending portions.

Based on the above, the number of battery units in the battery set of the disclosure can be selected according to actual needs, and the specific number of battery units may be connected in parallel or in series to form the battery set, so the flexibility in installation is high. Furthermore, any two of the battery units can be engaged and fixed by the corresponding engaging protrusion and the engaging groove, so not only is it easy to disassemble, it is also easy to expand/scale. In addition, the base used to carry the battery cells may be made by the same mold, so as to greatly reduce the production cost.

In order to make the aforementioned and other features and advantages of the disclosure more comprehensible, embodiments accompanying figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
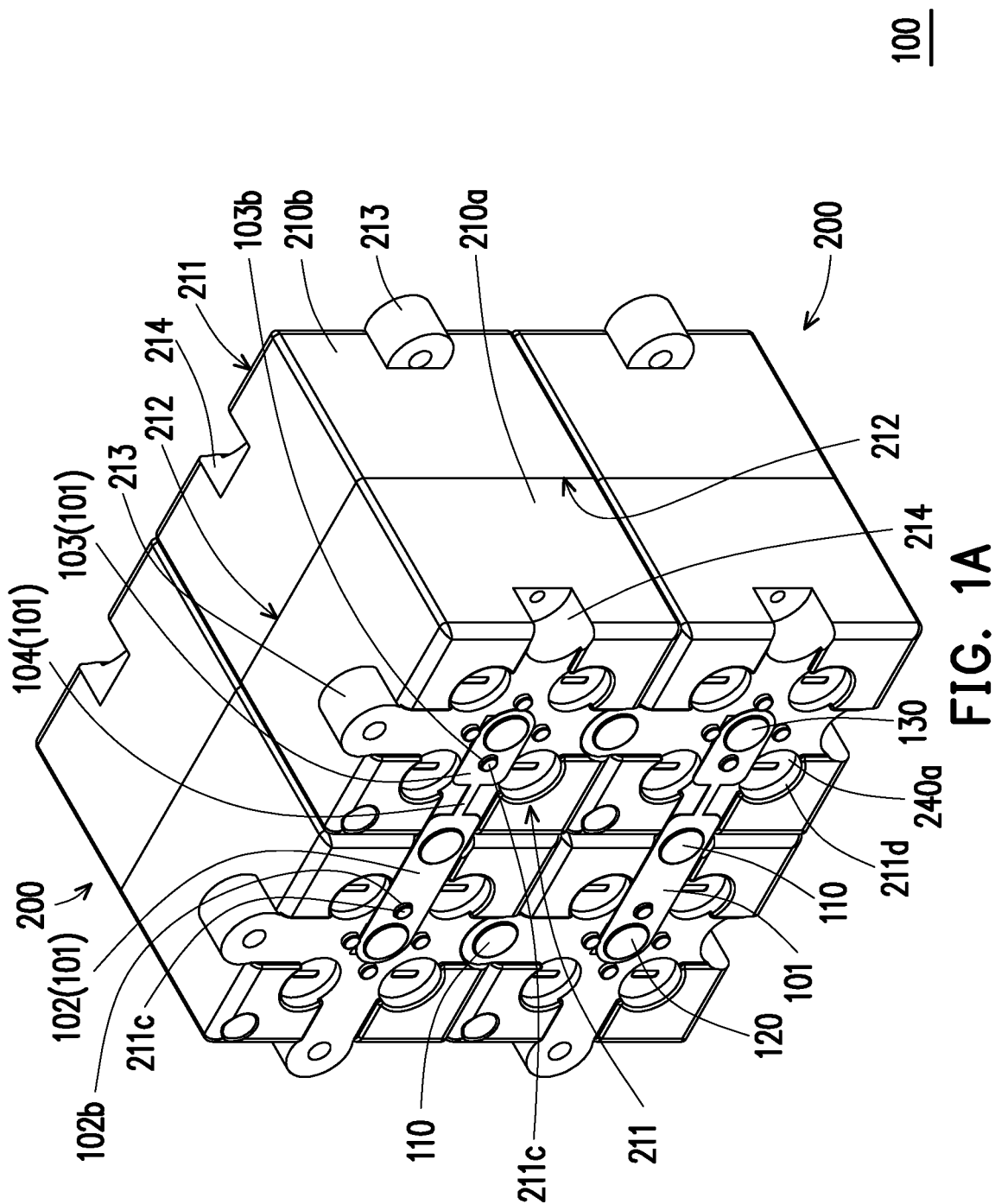
FIG. 1A and FIG. 1B are schematic views of a battery set according to one embodiment of the invention at two different viewing angles.

Reference will now be made in detail to the present preferred embodiments of the disclosure, examples of which are illustrated in the accompanying drawings. Wherever possible, the same reference numbers are used in the drawings and the description to refer to the same or like parts.

Figure 1B:
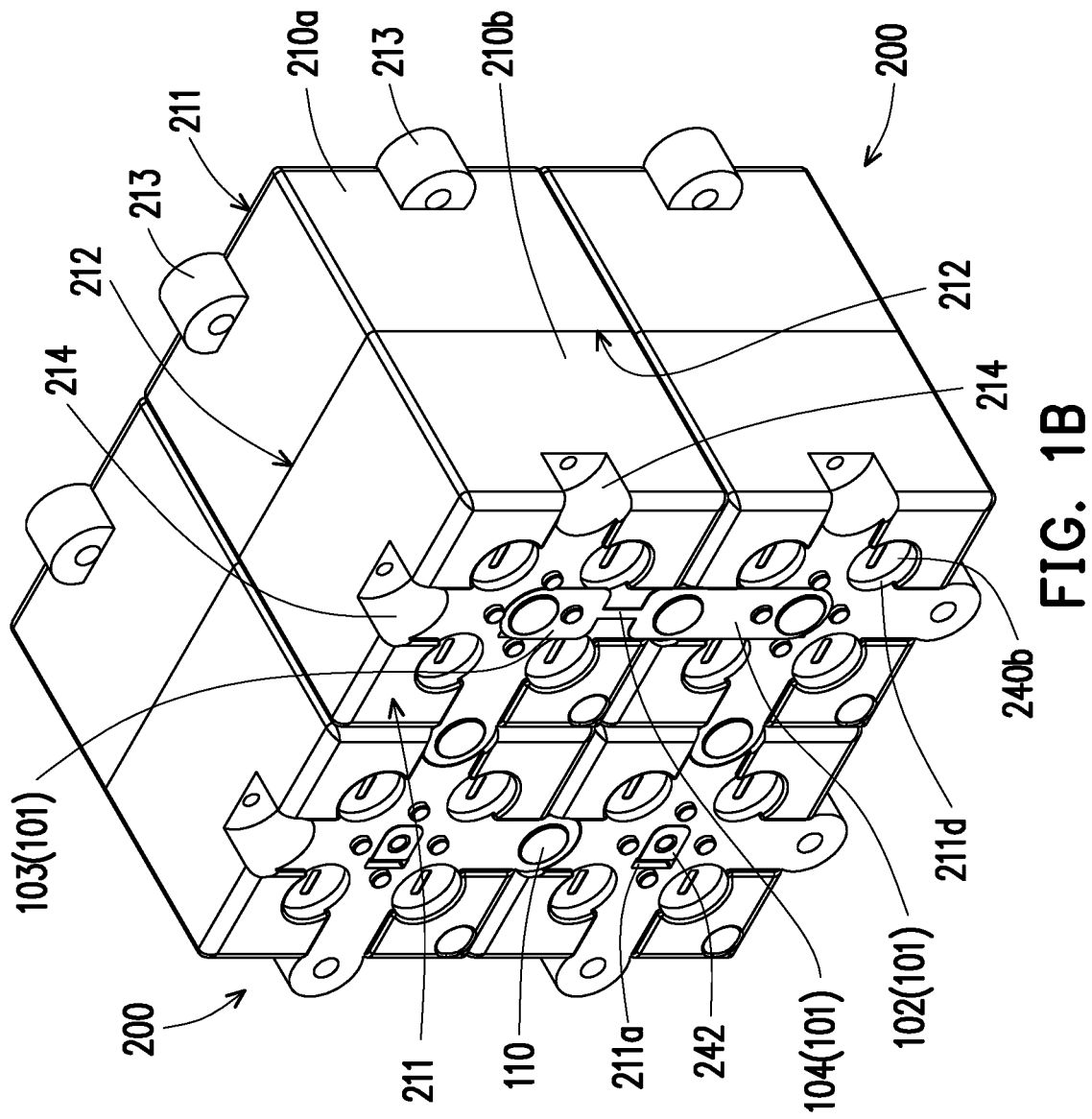
Figure 2A:
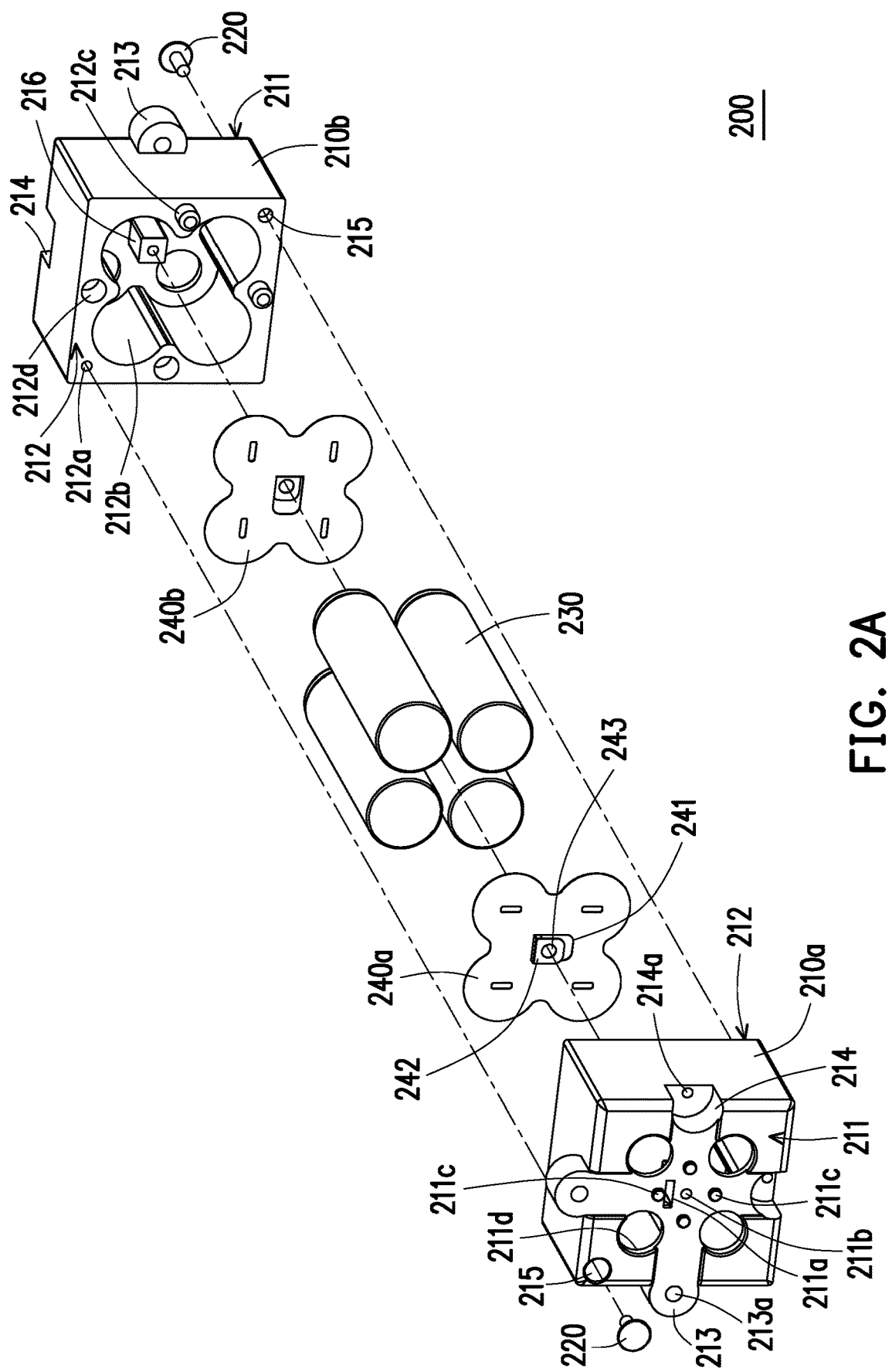
FIG. 2A and FIG. 2B are exploded schematic views of a battery unit according to one embodiment of the invention at two different viewing angles.
Figure 2B:
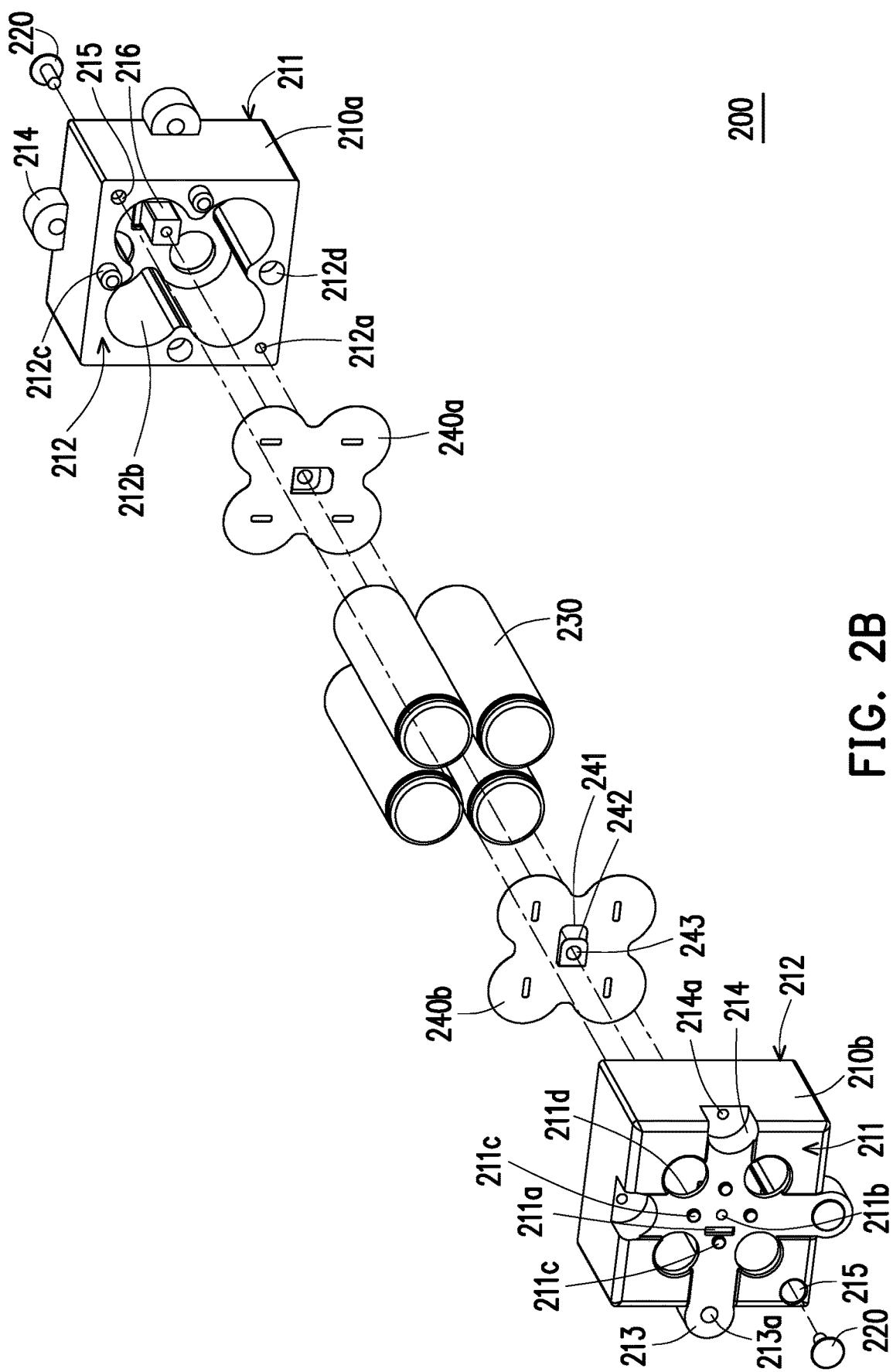

FIG. 1A and FIG. 1B are schematic views of a battery set according to one embodiment of the invention at two different viewing angles. FIG. 2A and FIG. 2B are exploded schematic views of a battery unit according to one embodiment of the invention at two different viewing angles. Referring to FIG. 1A to FIG. 2B, in the present embodiment, a battery set 100 is formed by engaging and fixing a plurality of battery units 200, and each of the battery units 200 includes a first base 210a, a second base 210b, two locking components 220, a plurality of battery cells 230, a first electrode piece 240a and a second electrode piece 240b. The first base 210a and the second base 210b have the same structural design and may be made by the same mold, so as to greatly reduce the production cost.

Each of the bases (including the first base 210a and the second base 210b) may be a cube which has a first surface 211, a second surface 212 opposite to the first surface 211 and four walls connecting the first surface 211 and the second surface 212. In addition, each of the bases (including the first base 210a and the second base 210b) is disposed with an engaging protrusion 213, an engaging groove 214, a through hole 215, a lock hole 212a and a recess 212b. The engaging protrusion 213 and the engaging groove 214 are all connected to the first surface 211. The through hole 215 penetrates the first surface 211 and the second surface 212, and the lock hole 212a and the recess 212b are all located at the second surface 212.

Based on above description, the number of the engaging protrusions 213 is two in each of the bases, and the engaging protrusions 213 are respectively extended from two side walls of each of the bases (including the first base 210a and the second base 210b). On the other hand, the number of the engaging grooves 214 is two in each of the bases, and the engaging grooves 214 are concave parts at other two side walls of each of the bases (including the first base 210a and the second base 210b). In other words, each of the engaging protrusions 213 and each of the engaging grooves 214 are respectively located at different side walls of each of the bases. In each of the bases, the two side walls where the engaging protrusions 213 are located are connected to each other and formed a L shape, and the other two side walls where the engaging grooves 214 are located are connected to each other and formed a L shape.

Figure 3A:
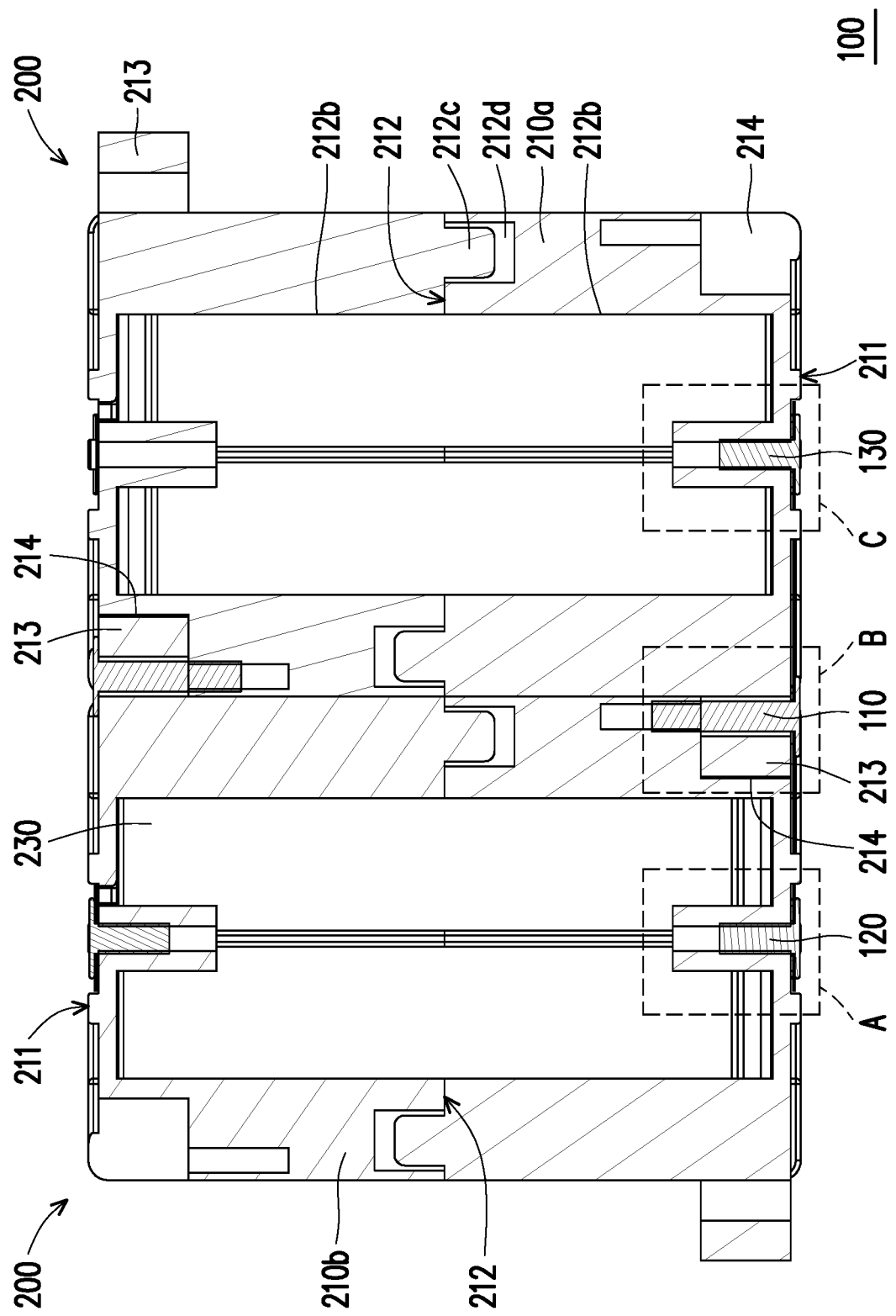
FIG. 3A and FIG. 3B are cross-sectional schematic views of a battery set according to one embodiment of the invention at two different cross-sections.
Figure 3B:
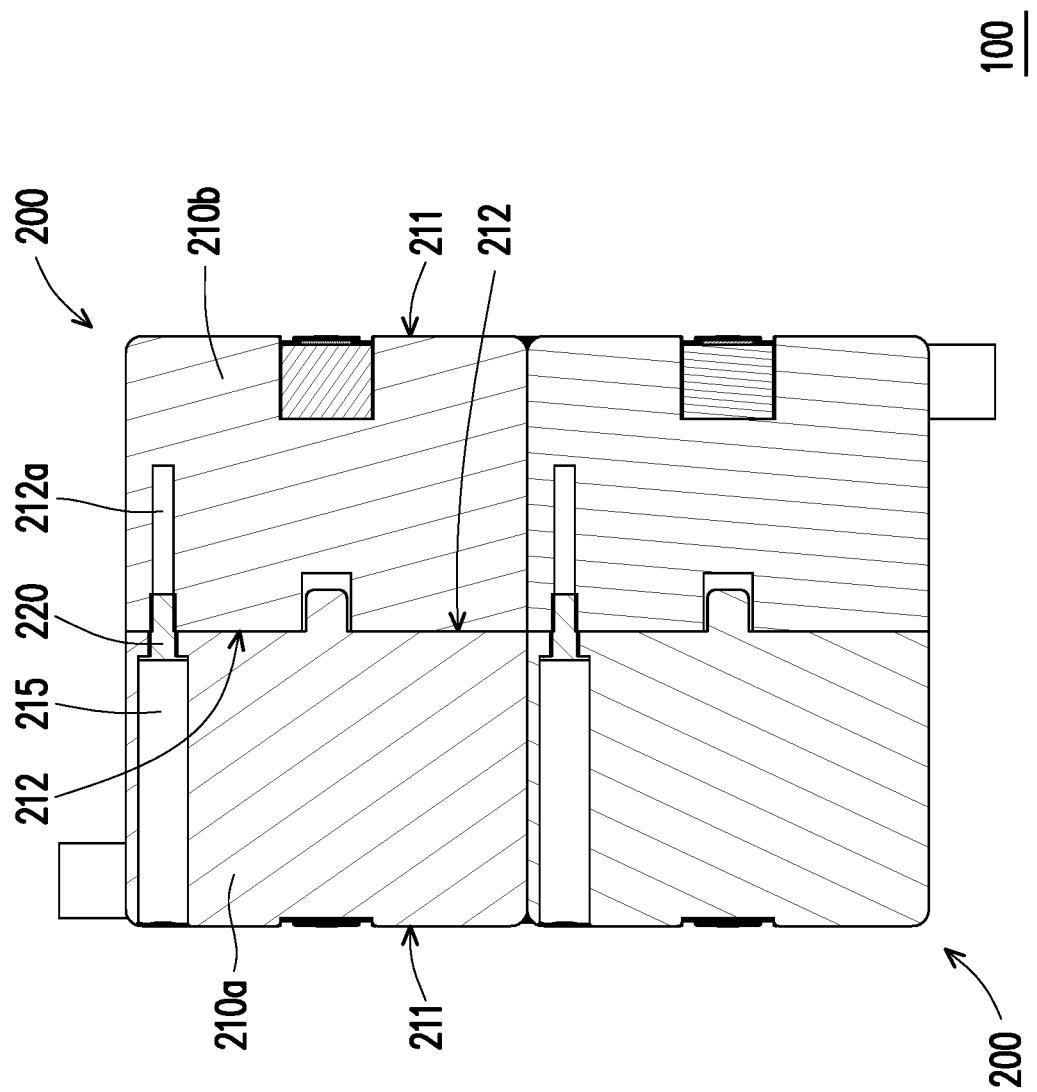
Figure 3C:
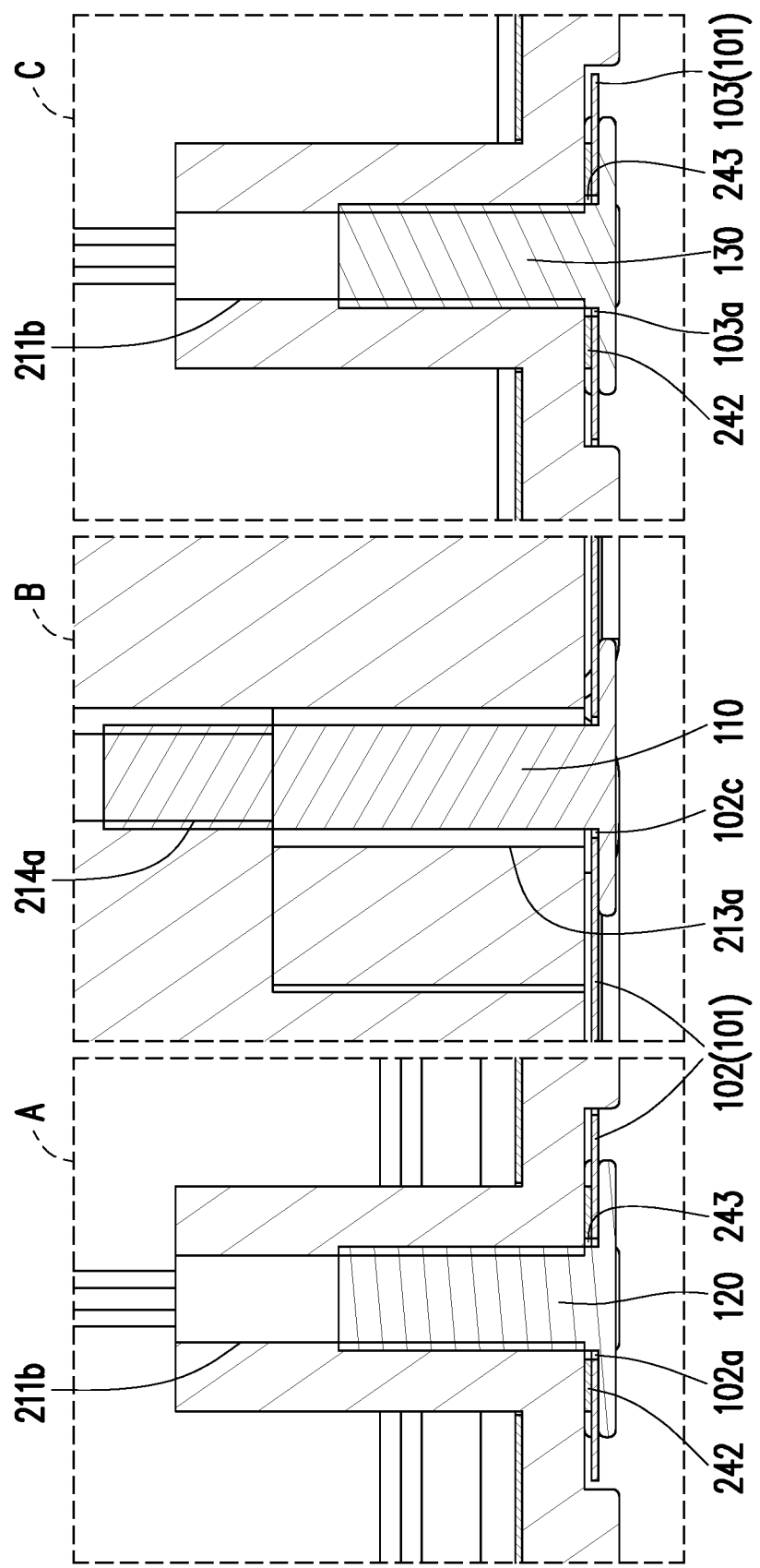
FIG. 3C is an enlarged schematic view of regions A to C in FIG. 3A.

FIG. 3A and FIG. 3B are cross-sectional schematic views of a battery set according to one embodiment of the invention at two different cross-sections. FIG. 3C is an enlarged schematic view of regions A to C in FIG. 3A. Referring to FIGS. 1A to 3C, in the process of installing the first base 210a and the second base 210b, the first electrode piece 240a is placed into the recess 212b of the first base 210a, and the second electrode piece 240b is placed into the recess 212b of the second base 210b. Next, one end of each of the battery cells 230 is placed into the recess 212b of the first base 210a or the second base 210b and abuts against the first electrode piece 240a or the second electrode piece 240b. After that, the second surface 212 of the first base 210a is placed to face the second surface 212 of the second base 210b. For the convenience of the installer when aligning, the second surface 212 of any of the bases is disposed with a guiding portion 212c and a guiding hole 212d, and the guiding portion 212c, the guiding hole 212d, the lock hole 212a and the through hole 215 surround the periphery of the recess 212b.

The guiding portions 212c may be guiding pillars, have quantity equal to the quantity of the engaging protrusions 213, and are adjacent to the side walls where the engaging protrusions 213 are located. On the other hand, the guiding holes 212d have quantity equal to the quantity of the engaging grooves 214, and are adjacent to the side walls where the engaging grooves 214 are located. Therefore, based on the assistance of the guiding portions 212c and the guiding holes 212d, the installer can quickly align the first base 210a with the second base 210b. After the guiding portions 212c of the first base 210a are inserted into the guiding holes 212d of the second base 210b and the guiding portions 212c of the second base 210b are inserted into the guiding holes 212d of the first base 210a, the two second surfaces 212 of the first base 210a and the second base 210b abut against each other, and the two recesses 212b of the first base 210a and the second base 210b are aligned and communicated with each other. After installing into position preliminarily, each of the battery cells 230 is received in the accommodating space formed by the two recesses 212b, the positive electrode of every battery cell 230 abuts against the same electrode piece, and the negative electrode of every battery cell 230 abuts against the same electrode piece.

After the first base 210a and the second base 210b are installed into position preliminarily, the through hole 215 of the first base 210a is aligned with the lock hole 212a of the second base 210b, and the through hole 215 of the second base 210b is aligned with the lock hole 212a of the first base 210a. Next, one of the locking components 220 (for example, a screw) is inserted through the corresponding through hole 215 and further locked into the corresponding lock hole 212a. Since the locking component 220 is inserted into and fixed in the through hole 215 and the lock hole 212a, the first base 210a and the second base 210b can be locked and fixed with each other.

On the other hand, the engaging protrusions 213 of the first base 210a are opposite to the engaging grooves 214 of the second base 210b. In other words, any side of the battery unit 200 is disposed with one engaging protrusion 213 and one engaging groove 214. When combining any two battery units 200, the engaging protrusion 213 and the engaging groove 214 of one of the battery units 200 are respectively engaged with the engaging groove 214 and the engaging protrusion 213 of another one of the battery units 200, and the structural interference is thus generated for preventing any two of the battery units 200 engaging with each other from being easily separated. On the other hand, the engaging protrusion 213 is disposed with a lock hole 213a, the engaging groove 214 has a lock hole 214a disposed therein. After the engaging protrusion 213 is engaged with the engaging groove 214, the lock hole 213a is aligned with the lock hole 214a, and the positioning member 110 (such as a screw) is locked into the two lock holes 213a and 214a. Since the positioning member 110 is inserted into and fixed in the two lock holes 213a and 214a, any two of the battery units 200 engaging with each other can be locked and fixed with each other.

Briefly, the installer can select the number of battery units 200 according to actual needs, and can assemble the specific number of battery units 200 into the battery set 100, so the flexibility in installation is high. Furthermore, any two of the battery units 200 can be engaged and fixed by the corresponding engaging protrusion 213 and the engaging groove 214, so not only is it easy to disassemble, it is also easy to expand/scale.

In the present embodiment, each of the bases (including the first base 210a and the second base 210b) is disposed with a position limiting portion 216 substantially located corresponding to the center point in the recess 212b. After the first base 210a and the second base 210b are installed into position preliminarily, the two position limiting portions 216 of the first base 210a and the second base 210b are aligned with each other and abut against the battery cells 230 accommodated in the two recesses 212b, so as to determine the relative position between the battery cells 230 and to prevent the battery cells 230 moving freely inside the first base 210a and the second base 210b.

The first electrode piece 240a and the second electrode piece 240b have the same structural design, each of the electrode pieces (including the first electrode piece 240a and the second electrode piece 240b) is disposed with a receding hole 241 at the central point and a conductive extending portion 242 adjacent to the receding hole 241. The receding hole 241 of each of the electrode pieces (including the first electrode piece 240a and the second electrode piece 240b) is configured to allow the position limiting portion 216 of the corresponding base (including the first base 210a and the second base 210b) to pass through. The cooperation of the receding hole 241 and the position limiting portion 216 can prevent each of the electrode pieces (including the first electrode piece 240a and the second electrode piece 240b) from moving freely in the corresponding base (including the first base 210a and the second base 210b). On the other hand, each of the bases (including the first base 210a and the second base 210b) further has a perforated slot 211a located at the first surface 211 and communicated with the recess 212b. The perforated slot 211a is adjacent to position limiting portion 216. The conductive extending portion 242 of each of the electrode pieces (including the first electrode piece 240a and the second electrode piece 240b) passes through the corresponding perforated slot 211a so as to pass through the corresponding base (including the first base 210a and the second base 210b) and extend to the first surface 211. A portion of each of the conductive extending portions 242 extending to the corresponding first surface 211 can be served as an electrical contact point and configured for any two of the battery units 200 engaging with each other being connected in parallel or in series.

Referring FIG. 1A to FIG. 3C, in the present embodiment, the battery units 200 are electrically connected with each other through electrical connecting components 101. To be more specific, each of the electrical connecting components 101 includes a first end 102 and a second end 103 opposite to each other, respectively disposed on two first surfaces 211 of two adjacent first bases 210a or two adjacent second bases 210b, and configured to contact two of the conductive extending portions 242 so as to electrically connect two adjacent battery units 200. It should be noted here, one end of each of the battery units 200 is a positive electrode portion, and the other ends of the other battery units 200 adjacent to the said positive electrode portion are negative electrode portions. On the contrary, another end of each of the battery units 200 is a negative electrode portion, and the other ends of the other battery units 200 adjacent to the said negative electrode portion are positive electrode portions. The first end 102 and the second end 103 of each of the electrical connecting components 101 are respectively configured to be electrically connected to the positive electrode portion and the negative electrode portion of two adjacent battery units 200.

In the present embodiment, if the number of the battery units 200 is n, the number of the electrical connecting components 101 is n−1, and n is a positive integer greater than or equal to 2. Further, if the number of the battery units is greater than or equal to 3, the first surfaces 211 of the first bases 210a may be spliced to form one side surface and the first surfaces 211 of the second bases 210b may be spliced to form another side surface, and the two side surfaces are respectively disposed with at least one electrical connecting component 101. As shown in FIG. 1A and FIG. 1B, the number of battery units is 4, one side surface formed by splicing the first surfaces 211 of the first bases 210a is disposed with two electrical connecting components 101 that respectively serially connect the two battery units 200 in the upper row and the two battery units 200 in the lower row. In addition, another side surface formed by splicing the first surfaces 211 of the second bases 210b is disposed with one electrical connecting component 101 that is used to serially connect one battery unit in the upper row and the other one battery unit in the lower row.

Referring to FIG. 1A to FIG. 3C, each of the bases (including the first base 210a and the second base 210b) further includes a lock hole 211b located at the center point of the first surface 211, and the conductive extending portion 242 of each of the electrode pieces (including the first electrode piece 240a and the second electrode piece 240b) is disposed with a position limiting hole 243. After one of the electrode pieces (including the first electrode piece 240a and the second electrode piece 240b) is placed into the recess 212b of the corresponding base (including the first base 210a and the second base 210b) and installed into position, the lock hole 211b of each of the bases (including the first base 210a and the second base 210b) is aligned with the position limiting hole 243 of the conductive extending portion 242 of the corresponding electrode piece (including the first electrode piece 240a and the second electrode piece 240b).

On the other hand, the first end 102 of the electrical connecting component 101 is disposed with a first assembling hole 102a, and the second end 103 of the electrical connecting component 101 is disposed with second assembling hole 103a. The first end 102 and the second end 103 are respectively pressed against two adjacent conductive extending portions 242, the first assembling hole 102a is aligned with the position limiting hole 243 of one of the conductive extending portions 242 and is aligned with the lock hole 211b corresponding to the position limiting hole 243. Next, the positioning member 120 (such as a screw) is locked into the first assembling hole 102a, the position limiting hole 243 and the lock hole 211b aligned with each other. The positioning member 120 is inserted into and fixed in the first assembling hole 102a, the position limiting hole 243 and the lock hole 211b aligned with each other, so as to ensure that the first end 102 and the conductive extending portion 242 are in contact and to prevent the electrical connecting component 101 from sliding, as shown in region A of FIG. 3C. Similarly, the second assembling hole 103a is aligned with the position limiting hole 243 of another one of the conductive extending portions 242 and is aligned with the lock hole 211b corresponding to the position limiting hole 243. Next, the positioning member 130 (such as a screw) is locked into the second assembling hole 103a, the position limiting hole 243 and the lock hole 211b aligned with each other. The positioning member 130 is inserted into and fixed in the second assembling hole 103a, the position limiting hole 243 and the lock hole 211b aligned with each other, so as to ensure that the second end 103 and the conductive extending portion 242 are in contact and to prevent the electrical connecting component 101 from sliding, as shown in region C of FIG. 3C.

Each of the bases (including the first base 210a and the second base 210b) further includes a plurality of positioning pillars 211c disposed on the first surface 211. The positioning pillars 211c surrounds the periphery of the lock hole 211b, a part of the positioning pillars 211c is located between the lock hole 211b and the engaging protrusions 213, and the other part of the positioning pillars 211c is located between the lock hole 211b and the engaging grooves 214. For the convenience of the installer when aligning, the first end 102 and the second end 103 of the electrical connecting component 101 are respectively disposed with the first positioning hole 102b and the second positioning hole 103b matching the positioning pillars 211c. While the first positioning hole 102b and the second positioning hole 103b are respectively sleeved on two adjacent positioning pillars 211c, the first positioning hole 102a and the second positioning hole 103a are also respectively aligned with the two position limiting holes 243 of the two adjacent conductive extending portions 242 simultaneously. On the other hand, the first end 102 of the electrical connecting component 101 is further disposed with the third assembling hole 102c. While the first positioning hole 102b and the second positioning hole 103b are respectively sleeved on two adjacent positioning pillars 211c, the third assembling hole 102c is aligned with two lock holes 213a and 214a of the engaging protrusion 213 and the engaging groove 214 engaging with each other, and the positioning member 110 being inserted into and fixed in the two lock holes 213a and 214a is also inserted into the third assembling hole 102c, so as to improve the reliability of installing the positioning member 110 between two first bases 210a or two second bases 210b, as shown in region B of FIG. 3C. The electrical connecting component 101 is locked and fixed to two adjacent first bases 210a or two adjacent second bases 210b by screwing, so it is convenient for the installer to disassemble, repair or replace.

In the present embodiment, the electrical connecting component 101 further includes a fuse portion 104 configured to connect the first end 102 with the second end 103, and the width of the fuse portion 104 is smaller than the first end 102 and is also smaller than the width of the second end 103, as shown in FIG. 1A. Based on the above, when the current load of the battery set 100 is too large, melt fracture would be present in the fuse portion 104 because of overheat, and this safety precaution can prevent the battery set 100 from being damaged or burned, so as to ensure the safety of people.

In addition, each of the bases further has a plurality of openings 211d located at the first surface 211, each of the openings 211d is communicated with the corresponding recess 212b to expose a part of the corresponding electrode piece (such as the first electrode piece 240a and the second electrode piece 240b), as shown in FIG. 1A to FIG. 2B. Based on the above, the heat generated when the battery set 100 operates can escape to the outside through the openings 211d.

In summary, the number of battery units in the battery set of the disclosure can be selected according to actual needs, and the specific number of battery units may be connected in parallel or in series to form the battery set, so the flexibility in installation is high. Furthermore, any two of the battery units can be engaged and fixed with each other by the corresponding engaging protrusion and the engaging groove, so not only is it easy to disassemble, it is also easy to expand/scale. After any two of the battery units are engaged and fixed with each other, the positioning member (such as screw) may be locked into the engaging junction of the two of the battery units, so as to prevent the two of the battery units engaging with each other from being easily separated. In addition, the base used to carry the battery cells may be made by the same mold, so as to greatly reduce the production cost.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:
1. A battery unit, comprising
two bases, each of the bases having a first surface, a second surface opposite to the first surface, an engaging protrusion, an engaging groove, a through hole penetrating the first surface and the second surface, a first lock hole located at the second surface, and a recess located at the second surface, wherein the engaging protrusion and the engaging groove are both connected to the first surface,
wherein the second surfaces of the two bases abut against each other, and the through hole of one of the two bases is aligned with the first lock hole of the other one of the two bases;
two locking components, being respectively inserted into and fixed to each of the through hole and the first lock hole of a corresponding base of the two bases;
a plurality of battery cells, disposed in the recesses of the two bases aligned with each other; and
two electrode pieces, respectively disposed in the two recesses, and two opposite ends of each of the battery cells respectively abut against the two electrode pieces, each of the two electrode pieces comprising a conductive extending portion, each of the conductive extending portions penetrating the corresponding base of the two bases and extending to the first surface.
2. The battery unit as recited in claim 1, wherein each of the two bases further comprises a perforated slot located at the first surface, and the perforated slot is interconnected with the recess, the conductive extending portion of each of the electrode pieces passes through the perforated slot to penetrate through the corresponding base of the two bases and to extend to the first surface.
3. The battery unit as recited in claim 1, wherein each of the two bases further comprises a positioning pillar disposed on the first surface and located between the conductive extending portion and the engaging protrusion or the engaging groove.
4. The battery unit as recited in claim 1, wherein each of the two bases has a position limiting portion disposed in the recess in correspondence, the position limiting portions of the two bases are aligned with each other and abut against the battery cells to determine the relative position between the battery cells.
5. The battery unit as recited in claim 1, wherein each of the two bases further comprises a guiding portion and a guiding hole located at the second surface and located at a periphery of the recess, the guiding portion of one of the two bases penetrates into the guiding hole of another one of the two bases.
6. A battery set, comprising:
n battery units as recited in claim 1, one of the n battery units being engaged with the engaging groove of another one of the n battery units through the engaging protrusion, each of the engaging grooves having a second lock hole disposed therein, each of the engaging protrusions having a third lock hole, the third lock hole of each of the engaging protrusions and the second lock hole of the engaging groove in correspondence being aligned with each other and a first positioning member being inserted and fixed therein;
n−1 electrical connecting components, configured to electrically connect the n battery units adjacent to each other,
the n−1 electrical connecting component comprises a first end and a second end opposite to each other, respectively disposed on the two first surfaces adjacent to each other, and configured to contact two of the conductive extending portions,
wherein n is a positive integer greater than or equal to 2.

7. The battery set as recited in claim 6, wherein each of the two bases further comprise a fourth lock hole located at the first surface, each of the conductive extending portions has a position limiting hole aligned with the fourth lock hole of the corresponding base of the two bases, the first end of the n−1 electrical connecting component is disposed with a first assembling hole, and the second end of the n−1 electrical connecting component is disposed with a second assembling hole, the first assembling hole, the position limiting hole of one of the conductive extending portions and the fourth lock hole of one of the bases are aligned with each other and a second positioning member is inserted and fixed therein, the second assembling hole, the position limiting hole of another one of the conductive extending portions and the fourth lock hole of another one of the bases are aligned with each other and a third positioning member is inserted and fixed therein.

8. The battery set as recited in claim 7, wherein each of the two bases further comprises a positioning pillar disposed on the first surface and located between the fourth lock hole and the engaging protrusion or the engaging groove, the first end and the second end of the n−1 electrical connecting component are configured to have a first positioning hole and a second positioning hole, respectively, and the first positioning hole and the second positioning hole are respectively sleeved on two of the positioning pillars.

9. The battery set as recited in claim 7, wherein the first end of the n−1 electrical connecting component further has a third assembling hole, the third assembling hole, one of the third lock holes and one of the second lock holes are aligned with each other and the first positioning member is inserted and fixed therein.

10. The battery set as recited in claim 7, wherein the n−1 electrical connecting component further comprises a fuse portion configured to connect the first end with the second end, a width of the fuse portion is smaller than a width of the first end and is smaller than a width of the second end.

* * * * *